United States Patent

Couvet et al.

Patent Number: 5,986,666
Date of Patent: Nov. 16, 1999

[54] METHOD FOR DYNAMIC GENERATION OF SYNTHETIC IMAGES WITH AUTOMATIC DETAIL LEVEL, AND IMPLEMENTATION DEVICE

[75] Inventors: Serge Couvet, Lege Cap Ferret; Christophe Delepine, Courdimanche, both of France

[73] Assignee: Thomson-CSF, Paris, France

[21] Appl. No.: 08/849,733

[22] PCT Filed: Oct. 31, 1996

[86] PCT No.: PCT/FR96/01716

§ 371 Date: Jul. 2, 1997

§ 102(e) Date: Jul. 2, 1997

[87] PCT Pub. No.: WO97/17677

PCT Pub. Date: May 15, 1997

[30] Foreign Application Priority Data

Nov. 3, 1995 [FR] France ................................ 95 13001

[51] Int. Cl.⁶ .................................................. G06T 17/30
[52] U.S. Cl. .......................................... 345/430; 345/418
[58] Field of Search ....................................... 345/418, 419, 345/423, 424, 425, 428, 429, 430

[56] References Cited

U.S. PATENT DOCUMENTS

| 5,722,408 | 3/1998 | Dehner et al. | 600/407 |
| 5,760,783 | 6/1998 | Migdal et al. | 345/430 |
| 5,793,371 | 8/1998 | Deering | 345/418 |
| 5,831,624 | 11/1998 | Rarolli et al. | 345/430 |
| 5,838,973 | 11/1998 | Carpenter-Smith et al. | 395/701 |
| 5,841,441 | 11/1998 | Smith | 345/430 |
| 5,844,567 | 12/1998 | Gossett et al. | 345/430 |
| 5,850,222 | 12/1998 | Cone | 345/418 |

*Primary Examiner*—Phu K. Nguyen
*Assistant Examiner*—Cliff N. Vo
*Attorney, Agent, or Firm*—Oblon, Spivak, McClelland, Maier & Neustadt, P.C.

[57] ABSTRACT

A method for dynamic generation of synthetic images employs Delaunay mesh generation. Only the terrain portions of which a significant variation in the detail level takes place are processed in real-time, this significant variation being determined by the angular error, from the observer's point of view, and relative to the various points of the terrain, which would be committed if these points were not processed, only the angular error greater than a certain threshold being taken into account.

19 Claims, 3 Drawing Sheets

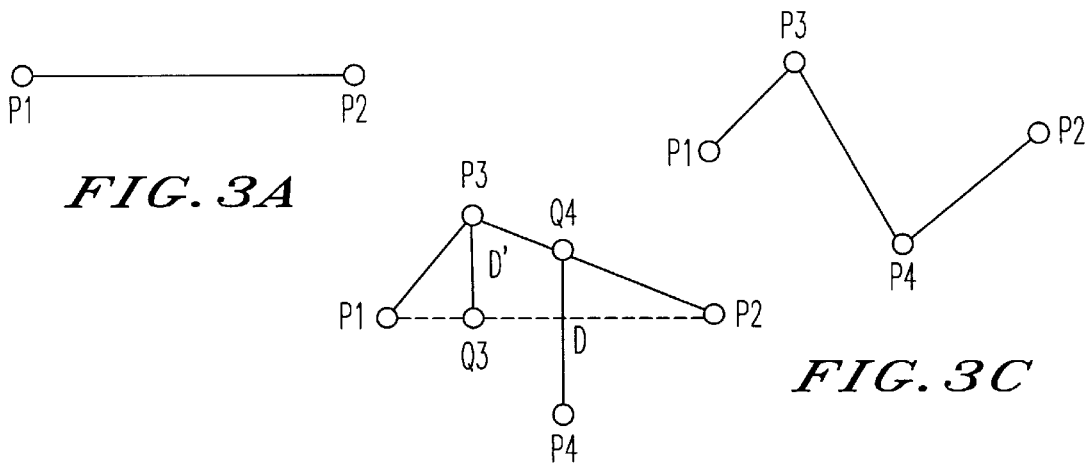
FIG. 3A
FIG. 3B
FIG. 3C
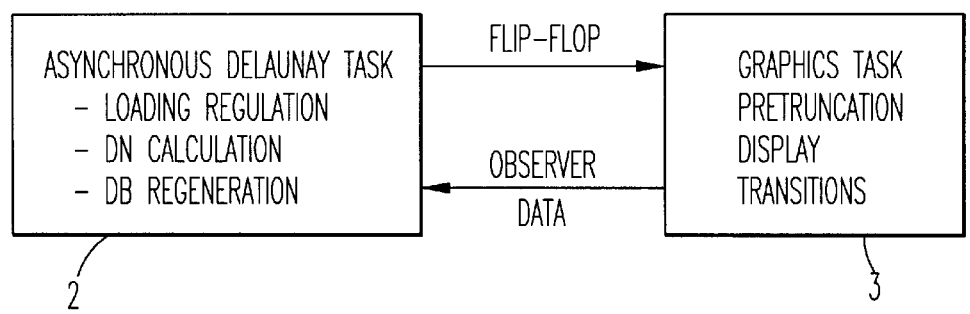
FIG. 4
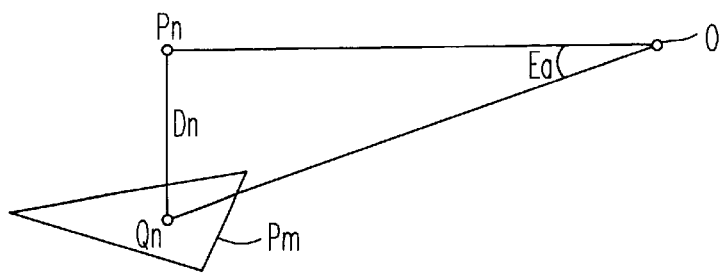
FIG. 5

METHOD FOR DYNAMIC GENERATION OF SYNTHETIC IMAGES WITH AUTOMATIC DETAIL LEVEL, AND IMPLEMENTATION DEVICE

BACKGROUND OF THE INVENTION

1. Field of the Invention

The present invention relates to a method for dynamic generation of synthetic images with automatic detail level, as well as to a device for implementing this method.

2. Discussion of the Background

The real-time image synthesis machines used in flight simulators can generate almost fully realistic images, in particular by large-scale use of photographic textures. However, the maximum number of polygons which can be displayed at each image cycle is still their main limitation.

Unfortunately, this number is found to be very poorly used in some situations. This is because the same attention is paid to the distant facets as to the close facets, irrespective of the observer's visibility distance. However, during calculation, the pertinence in the image of the distant facets is very small compared to those found close to the observer. Some attempts have been made in the past to simplify the long-distance landscape. However, it has been found that they are not very effective and are too constringent in terms of the database generation.

It is possible to visualize real terrains in synthetic images by virtue of the existence of altimetric maps resulting from radar or satellite observations. These altimetric data are generally in the form of a two-dimensional grid giving the altitude at each point.

The terrain model (algorithms and data structures) which manages these altimetric data should take into consideration the following three requirements which are essential, in particular for aircraft pilot simulators:

Faithfulness

The characteristic aspects of the relief (peaks, valleys) are very important visual references for pilots and influence the quality of their training and their decisions during a mission. Faithfully representing the ridge lines is therefore an essential criterion for any cartographic model.

Economy of Information

For equal precision, the number of polygons representing a given terrain directly influences the response times of a real-time simulator (rendition, collision, roll, intervisibility, etc.). Since the roughness of a terrain is not regular, the mesh generation should adapt to the relief, and be coarse in zones with constant slope and fine in undulating parts.

Speed of Generation

Since the simulation databases may cover thousands of km$^2$, their generation cost is directly linked with the use of high-performance algorithms which make it possible to integrate the various data sources (planimetry, altimetry, photometry) in a minimal amount of time.

Since the databases of aircraft simulators are in general very extensive, the number of facets representing the terrain is considerable. However, the visual system can display in real-time only a few thousands of facets. In order very rapidly to eliminate those which are not in the field of view, region pre-truncation is carried out. During the modelling of the database, the terrain is partitioned into rectangular zones referred to as regions. Simple pyramid-box intersection calculations make it possible to select the visible regions and thus eliminate a very large number of facets.

This division is also very useful if the database cannot be loaded into memory in one block. It is then sufficient to load only the regions lying in a sphere which is centred on the observer and has a radius equal to the visibility distance. This local database is updated as the observer moves: the regions leaving the sphere are dumped and replaced by those entering it. It is thus only memory space which limits the size of the databases.

For smaller visibility distances (<10 km) and a moderately undulating terrain, region pre-truncation is found to be sufficient in order to guarantee the image calculation frequency. Beyond this, the workload management of the visual system remains problematic. Overloading the visual system with polygons results in image jumps following cycle overflows. This situation is scarcely acceptable for a real-time flight simulator. The only remedy currently available is to simplify the zones of the database where the display "jams". This solution is expensive and not very practical. Furthermore, for large visibility distances, the relief is simplified far too much.

Only sophisticated detail level algorithms can greatly reduce the number of facets displayed without degrading the quality of the image. These algorithms have arisen from the following observation: the pertinence of a polygon of the terrain, that is to say the number of pixels which it occupies on the screen, decreases as the polygon becomes further away. If nothing is done, some of the graphics power of the machine is wasted on clipping, projecting, texturing, etc. polygons which, in the end, only occupy one or two pixels on the screen. The entire difficulty therefore consists in simplifying a terrain seen by a mobile observer without compromising the pertinence of the image.

Faced with the mathematical and algorithm complexity, no simulator manufacturer has integrated a device of this type truly effectively.

A first approach consists in precalculating various detail levels for each region and in switching from one level to another in real-time. Unfortunately, this method has many drawbacks:

Dependence on the Regions

Since the regions here fulfill the role of boundaries between detail levels, the quality of the switching depends on their sizes.

Memory Requirement

The memory requirement limits the number of detail levels per region and penalizes the dynamic loading of the database. Furthermore, this number varies as a function of the relief of each region.

Excessively Abrupt Switching

As the number of detail levels of a region decreases, the abruptness of the switching increases. These image artefacts are a great problem for the pilot.

In order to remedy these problems, hierarchical terrain models have been envisaged. A hierarchy of detail levels within the same data structure (quad tree, Delaunay pyramid) only stores the changes for moving from one detail level to another, which gives a significant memory saving. The tree structure is followed in order to select the triangles to be displayed as a function of the required precision.

Three major drawbacks remain

Overall Detail Level

The construction of the successive detail levels is based solely on a precision criterion, independently of an observer's position. The order in which the points appear is fixed, whereas the pertinence of the points does indeed vary as a function of the observer's position.

Modifications to the Terrain are Impossible

These hierarchical data structures are rigid and do not allow any modification to the terrain in real-time. It would be necessary to reconstruct the entire tree structure, which is too expensive.

Additional cost of generating the database.

The generation of the database remains something which is very expensive. The constraints linked with real-time complicate the modelling of the scene.

SUMMARY OF THE INVENTION

The subject of the present invention is a method for dynamic generation of synthetic images, allowing synthetic images to be generated in real-time as faithfully as possible and with the best possible rendition, without needing powerful calculation means, by taking account of the pertinence of the points of the various detail levels as a function of the observer's position, this method also allowing modifications to the configuration of the terrain in real-time.

A further subject of the invention is a dynamic generator of synthetic images, including means which are as inexpensive as possible, preferably means such as computers and database storage means which are simple and widely available.

The method according to the invention consists in forming a database from a file containing the topographical data relating to the terrains to be visualized, in eliminating the least significant data, then in calculating in real-time the points to be displayed as a function of the required detail level, which is itself a function of the observer's position, the maximum altitude of the terrain to be visualized, the visibility distance and the required detail level, by selecting a subset of points in the database which define a terrain portion whose detail level has changed, in performing irregular mesh generation on the selected terrain portion, preferably a mesh generation of the Delaunay type, and in applying a texture to the polygons resulting from the mesh generation.

According to one aspect of the method of the invention, the precision of the representation of the terrain is adjusted locally by adding or removing points in the mesh, these points being selected as a function of the relief, the observer's position and the type of vehicle carrying the observer.

BRIEF DESCRIPTION OF THE DRAWINGS

The present invention will be understood more clearly on reading the detailed description of an illustrative embodiment, illustrated by the appended drawing, in which:

FIGS. 3A–3C are explanatory diagrams showing the effect of the insertion of a significant point on the triangulation error, FIG. 4 is a simplified diagram of the software architecture of a graphics processor employing the method of the invention, FIG. 5 is a simplified explanatory perspective view defining the angular error criterion used by the present invention.

DISCUSSION OF THE PREFERRED EMBODIMENTS

Figure 1:
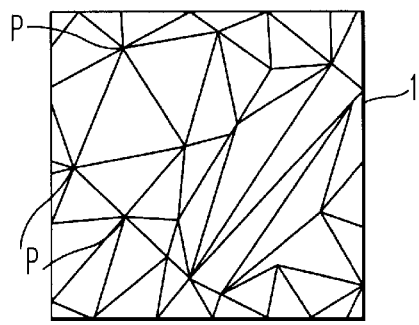
FIG. 1 is an example of constrained Delaunay triangulation, which can be employed by the present invention.

To produce a terrain model, the present invention employs a mesh generation technique based on Delaunay triangulation, and more precisely constrained Delaunay triangulation, schematically illustrated in FIG. 1. The points P defining the nodes of the mesh may be arbitrarily distributed in the plane of the region 1 being processed. This region 1 is one of the zones of the terrain. In the example in FIG. 1, this zone is simply a rectangle.

This mesh generation technique has a number of advantages. First, the simplicity of the objects (triangles) that are processed makes it possible to process them in real-time. This is due, in particular, to the fact that the majority of visualization and geometrical manipulation algorithms are simplified and accelerated by virtue of the exclusive use of triangles. Furthermore, for a given set of points (points of an altimetric map), the corresponding Delaunay triangulation is unique, which allows these points to be processed in any desired order. The remarkable property of Delaunay triangulation is that it generates triangles which are as equilateral as possible. This property is very advantageous in image synthesis, for which it reduces the problems of smoothing and numerical precision.

Delaunay triangulation allows a point to be added to or removed from an already triangulated set without having to recalculate all the points, because of the solely local influence of such a point. An interactive manipulation of this type is also beneficial for the real-time modification of a visualized terrain.

Constrained Delaunay triangulation guarantees the existence of certain edges in the mesh, which makes it possible to respect the geometry of the objects integrated in the terrain (roads, railway lines, buildings, etc.).

Further to triangulation, the present invention employs filtering of the visualized terrain surfaces. This filtering makes it possible to eliminate the least significant points of this surface, which makes it possible to simplify the processing of the geographical zone to be visualized. The triangulation then carried out on the remaining points of this surface corresponds to the finest detail level of the database which provides these points.

The filtering consists in using an iterative process to refine the triangulation of the terrain. For each point P, the distance between this point and the point Q which is the projection of P onto the current triangulation is calculated. This distance corresponds locally to the error existing between the surface of the approximated terrain (resulting from the current triangulation) and the surface of the real terrain. After having thus calculated the errors relating to the various points, the point of maximum error is selected, and is inserted into the current triangulation. This step is repeated until the maximum error of the points of the zone in question is less than a threshold, which is fixed as a function of the desired realism of the display, and while taking into account the computing power needed to cross this threshold for various types of terrains.

Figure 2:
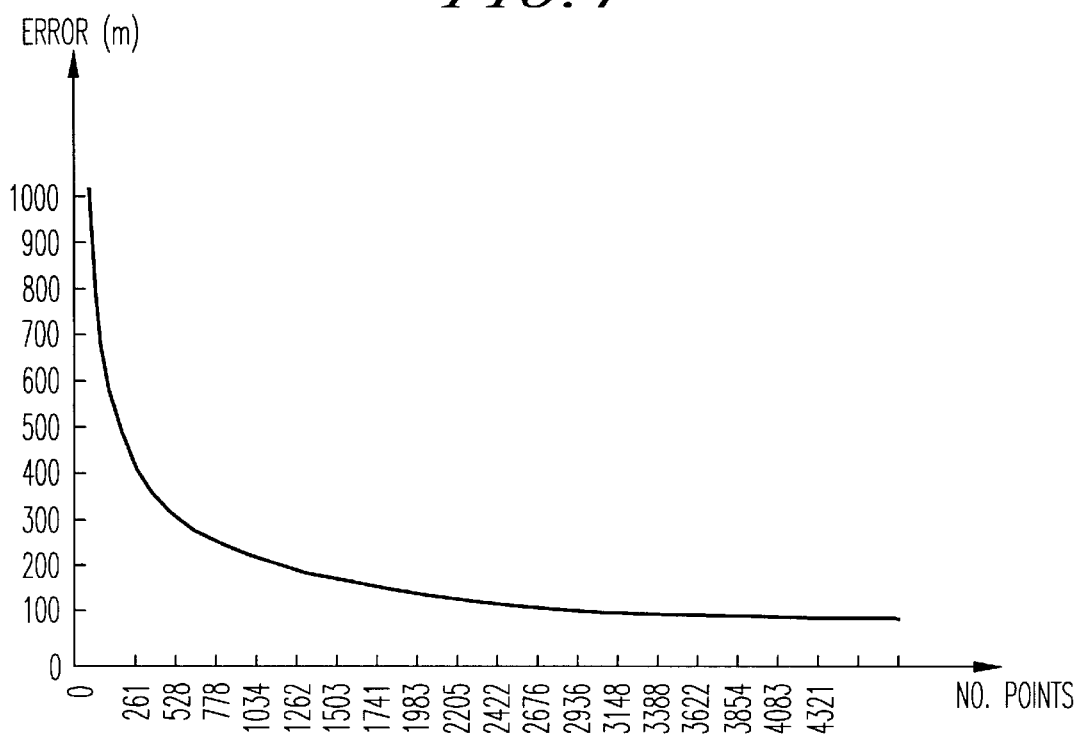
FIG. 2 is a diagram showing the change in the triangulation error of a surface as a function of the number of points chosen to represent it.

The curve in FIG. 2 shows the change in the error (corresponding to the distance PQ as defined above) as a function of the number of points defining a given zone. Since the terrain is not in general a convex surface, the insertion of a point into the current triangulation may have the effect of increasing the error instead of decreasing it.

Thus, for example as represented in FIG. 3A, it is assumed that four points P1, P2, P3 and P4 are initially available along an undulating terrain section. The initial approximation is the segment P1–P2. The point which is then inserted is the one for which the distance to the segment P1–P2 is the greatest. Let us assume that this is P3. It is then observed that the new error of P4 (distance from P4 to the segment P3–P2) may be greater than the distance D' between P3 and its projection Q3 on to the segment P1–P2. It is in general observed that, after several consecutive insertions, the error finally falls below the value (D' in the example in FIG. 3A) which it had when the first point was inserted (P3, for the example in question). In practice, this insertion step is repeated until the maximum error becomes less than a threshold which is fixed. In the diagram in FIG. 2, the temporary peaks due to the insertion of points (such as P4) corresponding to reliefs having the opposite curvature to the current curvature have been removed. Thus, according to this FIG. 2, a quasi-exponential decrease in the maximum error is observed as soon as the number of points defining a given zone (of dimensions of the order of 100 km$^2$) exceeds one thousand. It is therefore easy, for a given type of relief (little undulation, moderately mountainous, very mountainous, etc.) to carry out tests in order to obtain a curve such as the one shown in FIG. 2, and to optimize the ratio between the accuracy of the representation of the terrain and the number of points needed for a faithful representation of the terrain, without unnecessarily overloading the graphics calculation processor or "graphics engine" (beyond a certain number of points, the gain in precision comes derisory in view of the increase in the number of calculations).

On the basis of the principles set out above, the invention consists in modifying the database in real-time so as to send the graphics engine only the polygons characteristic of the observer's point of view. The precision of the terrain is adjusted locally by adding and removing points in the current mesh. The selection of the points to be inserted and to be removed takes into account the relief (in particular in order properly to respect the ridge lines, which are an important element of the landscape for a helicopter or aircraft pilot), the observer's position and the type of vehicle (tank, aircraft, helicopter, etc.).

The diagram in FIG. 4 gives a simplified representation of the two main software layers 2, 3 of the graphics engine employing the method of the invention. Layer 2 is the one charged with the Delaunay triangulation, carried out in asynchronous mode. Amongst other things, it regulates the loading of the processor (optimization of the processing of the data packets being exchanged in asynchronous mode), calculates the detail level and regenerates the database (after local modification of the description of the terrain) in the format of the host processor.

Layer 3 is the graphics task proper, which refreshes the screen at a rate of, for example, 30 Hz. This task essentially carries out the pretruncation of the regions (so as to have to display only the regions visible to the user), the display and the transition between two detail levels.

The interaction between the two software layers 2 and 3 takes place in the following way. It is assumed that the graphics system is displaying scenes which are to be seen by an observer located in a mobile vehicle simulator at a given instant. At regular time intervals (for example at a rate of 30 Hz, as specified above), the graphics task 3 sends the Delaunay-meshed polygons to be displayed (as a function of the movement of the said vehicle). These polygons correspond to the current detail level which is being displayed. The Delaunay task 2 asynchronously recalculates the appropriate detail level, in order to take into account the change in the observer's position relative to the displayed region. The points which have become pertinent as a result of this (visible by the observer and necessary for realistic definition of the landscape, that is to say not too far away from the observer) are inserted into the Delaunay mesh. The points which have become superfluous are removed. The method for selecting these points is explained in more detail below. As soon as the new mesh is calculated, it is substituted for the old one by toggling (marked "flip-flop" in FIG. 4).

In response to each request for a change in detail level which is sent by the layer 3, the graphics processor recalculates the pertinence of the points from the database. In the case of an observer who can turn very quickly (helicopter pilot or tank driver), all the terrain regions of the local database are processed. In the contrary case (civil aviation pilot, etc.), only the regions relating to the heading of the vehicle are recalculated. The number of regions to be processed can thus be reduced. The points to be inserted in or removed from a mesh are selected while respecting the following three criteria:

1) criterion of determinism. The triangulation obtained for a given observer position should always be the same, irrespective of the path followed by this observer to reach this position. In other words, the calculation of the pertinence of a point must be independent of the preceding calculations.
2) criterion of aspect continuity of the regions. If a point is inserted in or removed from a region edge, it must also be inserted in or removed from the neighbouring region. This guarantees geometrical connection between neighbouring regions.
3) criterion of respecting the relief. The characteristic points of the terrain must be preserved.

According to the invention, the calculation of the pertinence of a point Pn of a mesh (that is to say the determination of the need to keep this point or remove it when changing the detail level) takes place as follows.

Let O be the point in space where the observer is located, and let Qn be the vertical projection (along the local vertical) of Pn on to the triangulation Pm which does not contain the point Pn. The variable determining the pertinence of the point Pn is the angle Ea formed by the half-lines OPn and OQn (see FIG. 5). This angle Ea can be referred to as the angular error (corresponding to the removal of Pn).

In order to meet the first criterion mentioned above, it is important for the evaluation of the angle Ea always to be of the same value for a given current position of the point, because otherwise the triangulation would be non-deterministic. An instability phenomenon would even be produced if the calculation of Ea depended on the neighbouring points, because the insertion of a point would then affect the angular errors of the neighbouring points, which could lead to an infinite look of point insertions and removals. Furthermore, the boundary points between two adjacent regions would not be inserted or removed at the same time, because their angular errors would be different, and the above criterion 2 would not be met.

For all these reasons, when calculating Ea, the distance Dn between Pn and Qn is not calculated by projecting Pn on to the current triangulation which does not contain Pn. Instead, this distance becomes constant and is precalculated in the manner explained above with reference to FIGS. 3A to 3C. During the visual simulation, this elevation error is converted into an angular error relative to the observer. If the angular error thus calculated is greater than a threshold value Ethreshold, the point Pn is inserted, otherwise it is removed.

The graphics task 3 controls the switching of the detail level, that is to say the switching between a scene prior to an operation of point insertion/removal, due to a change in the observer's position, and a scene just after this operation. The process of toggling from a detail level N to a detail level N+1 has been represented in simplified fashion in FIG. 6, which is a view from above. To prevent the transition between the triangulations that correspond to these detail levels from producing a visual artefact referred to as "popping", but instead for it to be virtually invisible, or in any case so that it does not cause a problem, morphing is carried out, this being an interpolation technique which is well-known per se. The intermediate morphing triangulation is displayed throughout the time taken for the morphing operation (in order to avoid having an abrupt jump between the initial and final detail levels). This intermediate triangulation is calculated by preserving the points of the triangulations of the two detail levels, while adding the possible intersection points to them.

Figure 6:
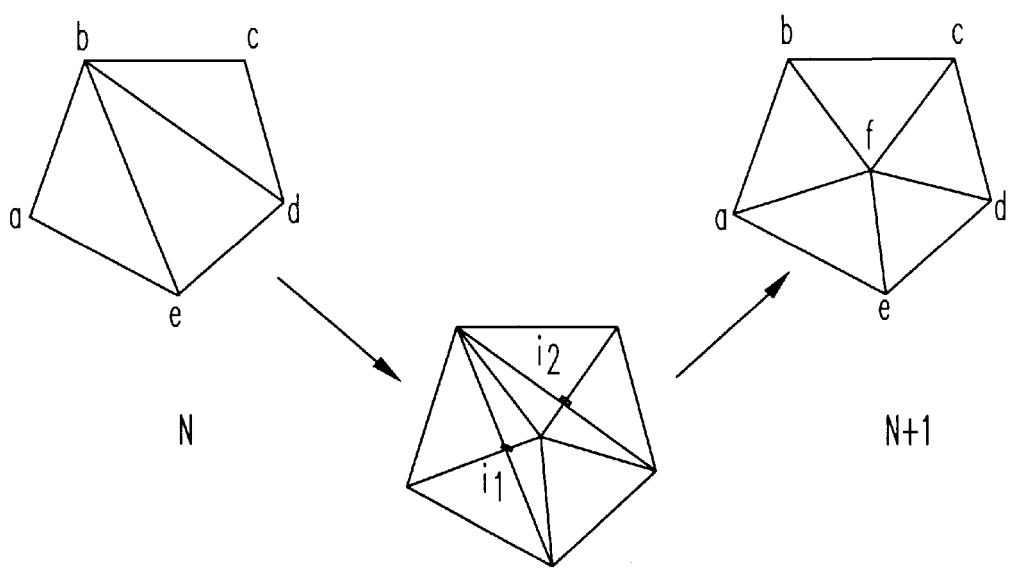
FIG. 6 is a simplified example explaining the toggling from a detail level N to a detail level N+1, according to the invention.

In the simplified example in FIG. 6, three adjacent non-coplanar triangles forming part of the detail level N are represented on the left, these triangles together forming a skew surface with pentagonal contour a, b, c, d, e, in which the edges that are each common to two triangles are be and bd. The detail level N+1 has been represented on the right of the figure (it would equally well be possible to discuss the level N−1), the skew surface of which has the same pentagonal contour a, b, c, d, e as in the detail level N, but has a vertex f which, when viewed from above, lies substantially at the centre of the pentagonal contour. This vertex f is joined by five edges to the five respective vertices of the pentagon. The intermediate triangulation has been represented at the middle of FIG. 6.

In order to ensure a virtually invisible transition between the detail levels N and N+1, three new points are imposed in the initial triangulation (see the representation at the middle of FIG. 6):

$i_1$ on the edge be (on the vertical passing through be and af)

$i_2$ on the edge bd (on the vertical passing through bd and cf)

f on the face bde (on the vertical passing through the final position of f).

These three points are then progressively shifted (morphing operation), until:

$i_1$ is on the edge af $i_2$ is on the edge fc f reaches its reference position.

When the final positions of these three points have been reached, the morphing operation is ended, and the new triangulation of the detail level N+1 is displayed (that is to say the triangular surface on the right in FIG. 6).

The speed of rise of a point depends on several factors, in particular at least one of the following factors:

its visibility by the observer. Thus, a point which does not lie in the observer's instantaneous field of view is raised immediately.

the observer's speed of movement. Thus, when he is stationary, the raising of the points is frozen.

the distance from the point to the observer. For equal altitude, the point rises faster as its distance from the observer increases.

By virtue of these characteristics of the method of the invention, rapid switching of the consecutive detail levels is obtained, with the best possible fluidity of transition between images.

The other advantages of the invention are:

a reduction in the volume of the database without loss of image quality. The visualization system is capable of calculating an image with rendition equal to that obtained by the methods of the prior art, with far fewer polygons: on average, ⅔ of the facets can be removed without degrading the image.

automation of the workload management of the graphics processor. It adapts the database to the hardware performance simply by adjusting a parameter (threshold angular error). It therefore makes it possible to obtain the best possible realism for the scene display, in view of the capacities of the graphics and visualisation system.

It simplifies the generation of the database: precalculation of the detail levels becomes superfluous (the appropriate detail level is generated directly by the triangulation layer 2), which commensurately reduces the cost price of the means for producing the database.

It allows real-time modification of the representation of the terrain, in particular in order to make it possible to adapt to demanding simulation scenarios, or to new requirements, for example shared interactive simulation.

We claim:

1. Method for dynamic generation of synthetic images with automatic detail level, according to which a database is formed starting from a file containing the topographical data relating to the terrains to be visualized, and the least significance data are eliminated, characterized in that the points to be displayed are calculated in real-time as a function of the required detail level, which is itself a function of the observer's position, the ridge lines of the terrain to be visualized, the visibility distance and the required detail level, in that a subset of points is selected from the database, defining a terrain portion whose detail level has changed, in that irregular mesh generation is carried out on the selected terrain portion, and in that a texture is applied to the polygons resulting from the mesh generation.

2. Method according to claim 1, characterized in that the mesh generation is of the Delaunay type.

3. Method according to claim 1, characterized in that the required detail level is determined as a function of the maximum allowed angular error as seen by the observer.

4. Method according to claim 1, characterized in that the transition between successive detail levels takes place at the refresh rate of the screen for displaying the synthetic images.

5. Method according to claim 4, characterized in that the rise or fall speed of an inserted or removed point is variable.

6. Method according to claim 5, characterized in that the said speed is a function of its visibility by the observer and/or the observer's speed of movement and/or the distance from the point to the observer.

7. Method according to one of claim 4, characterized in that the transition between successive detail levels takes place by morphing.

8. Method according to claim 2, characterized in that the required detail level is determined as a function of the maximum allowed angular error as seen by the observer.

9. Method according to claim 2, characterized in that the transition between successive detail levels takes place at the refresh rate of the screen for displaying the synthetic images.

10. Method according to claim 3, characterized in that the transition between successive detail levels takes place at the refresh rate of the screen for displaying the synthetic images.

11. Method according to claim 8, characterized in that the transition between successive detail levels takes place at the refresh rate of the screen for displaying the synthetic images.

12. Method according to claim 9, characterized in that the rise or fall speed of an inserted or removed point is variable.

13. Method according to claim 10, characterized in that the rise or fall speed of an inserted or removed point is variable.

14. Method according to claim 11, characterized in that the rise or fall speed of an inserted or removed point is variable.

15. Method according to claim 12, characterized in that the said speed is a function of its visibility by the observer and/or the observer's speed of movement and/or the distance from the point to the observer.

16. Method according to claim 13, characterized in that the said speed is a function of its visibility by the observer and/or the observer's speed of movement and/or the distance from the point to the observer.

17. Method according to claim 14, characterized in that the said speed is a function of its visibility by the observer and/or the observer's speed of movement and/or the distance from the point to the observer.

18. Method according to claim 5, characterized in that the transition between successive detail levels takes place by morphing.

19. Method according to claim 6, characterized in that the transition between successive detail levels takes place by morphing.

* * * * *